United States Patent
Ranchin et al.

(10) Patent No.: US 6,820,472 B2
(45) Date of Patent: Nov. 23, 2004

(54) TEST RIG AND TEST SYSTEM FOR TESTING A POWER TRANSMISSION DEVICE

(75) Inventors: Michel Ranchin, Lancon le Provence (FR); Lucien Mistral, Chateauneuf-les-Martigues (FR)

(73) Assignee: Eurocopter, Marignane Cedex (FR)

( * ) Notice: Subject to any disclaimer, the term of this patent is extended or adjusted under 35 U.S.C. 154(b) by 49 days.

(21) Appl. No.: 10/310,997

(22) Filed: Dec. 6, 2002

(65) Prior Publication Data

US 2003/0107384 A1 Jun. 12, 2003

(30) Foreign Application Priority Data

Dec. 7, 2001 (FR) .......................................... 01 15841

(51) Int. Cl.[7] .......................................... G01M 13/02
(52) U.S. Cl. ................................................ 73/118.1
(58) Field of Search ................... 73/112, 116, 117.2, 73/117.3, 118.1, 119 R

(56) References Cited

U.S. PATENT DOCUMENTS

| | | | | |
|---|---|---|---|---|
| 4,159,642 A | * | 7/1979 | Hudson et al. | 73/118.1 |
| 5,142,903 A | * | 9/1992 | Mizushina et al. | 73/118.1 |
| 5,189,908 A | * | 3/1993 | Sano et al. | 73/118.1 |
| 5,363,317 A | * | 11/1994 | Rice et al. | 702/34 |
| 5,537,865 A | * | 7/1996 | Shultz | 73/118.1 |
| 5,693,896 A | * | 12/1997 | Mistral et al. | 73/865.9 |
| 6,047,596 A | * | 4/2000 | Krug et al. | 73/162 |
| 6,155,948 A | * | 12/2000 | Gierer | 475/123 |
| 6,343,504 B1 | * | 2/2002 | Shultz | 73/118.1 |
| 6,393,904 B1 | | 5/2002 | Krug et al. | |
| 6,507,789 B1 | * | 1/2003 | Reddy et al. | 702/34 |
| 2003/0079531 A1 | * | 5/2003 | Ranchin | 73/118.1 |
| 2003/0107384 A1 | * | 6/2003 | Ranchin et al. | 324/555 |
| 2004/0154416 A1 | * | 8/2004 | Bruggemann et al. | 73/865.9 |

FOREIGN PATENT DOCUMENTS

| | | |
|---|---|---|
| WO | 9404903 | 3/1994 |
| WO | 9960362 | 11/1999 |

OTHER PUBLICATIONS

Search Report dated Sep. 9, 2002 with English translation.

* cited by examiner

*Primary Examiner*—Eric S. McCall
(74) *Attorney, Agent, or Firm*—Stevens, Davis, Miller & Mosher, LLP

(57) ABSTRACT

A test rig for testing a power transmission device, having an input shaft, an output shaft and a casing, may include a first assembly having a coupling shaft that is connected by a rigid and coaxial coupler to the output shaft of the power transmission device. A second assembly of the test rig is connected to the input shaft. The casing is mounted on a position-adjustable support, and a controllable adjusting device adjusts the position of the support. The adjusting device adjusts the position of the support so as to apply forces and moments acting along six degrees of freedom of the casing to the casing, and the support and the adjusting device bring the casing into a spatial position such that all the forces and moments likely to be generated on the output shaft are applied to the casing.

20 Claims, 2 Drawing Sheets

TEST RIG AND TEST SYSTEM FOR TESTING A POWER TRANSMISSION DEVICE

BACKGROUND OF THE INVENTION

The present invention relates to a test rig for testing a power transmission device and to a test system comprising such a test rig provided with a power transmission device.

Although not exclusively, said test rig is intended more particularly for testing a transmission gearbox (main, intermediate or tail transmission gearbox) of a helicopter.

It is known that a test rig is generally used for carrying out two types of test, namely:

- development tests, the purpose of which is to simulate the actual operating conditions as faithfully as possible (particularly to simulate the rotor head loading pattern and the levels of load on a main transmission gearbox for a helicopter) of the power transmission device; and
- acceptance tests, the purpose of which is to check the correct operation of the various mechanical parts, under a standard loading spectrum (measuring torque, rotational speeds and temperatures in particular).

DESCRIPTION OF THE PRIOR ART

In general, such a test rig for testing a power transmission device comprising at least an input shaft (drive shaft for example), an output shaft (rotor shaft for example) and a casing, comprises:

- a first assembly comprising first coupling means and a coupling shaft (or transmission) which can be connected to the output shaft of the power transmission device that is to be tested, via said first coupling means;
- a second assembly which can be connected to the input shaft of said power transmission device via second coupling means; and
- in the case of a closed-loop test rig, at least one transmission shaft connecting said first and second assemblies.

On such a conventional test rig, the casing of the power transmission device that is to be tested which, when mounted on the test rig, is fixed to an immobile support is secured to a fixed frame of reference which is taken as reference. In addition, said first and second coupling means are designed to take into consideration and compensate, in particular, the imperfections in the manufacture, the integration faults and the deformations caused by the various forces acting on the power transmission device. The loading pattern is introduced in a frame of reference that is rotating on the output shaft (rotor shaft).

A test rig of this type has numerous disadvantages, in particular:

- the need to have first coupling means (for connecting the coupling shaft of said first assembly to the output shaft of said power transmission device) which are highly complex so as to be able to absorb the main positioning faults of the power transmission device, particularly of its casing, with respect to a theoretical frame of reference. These positioning faults are manifested, in particular, in defects of alignment (defects of parallelism and angular misalignments) and differences in length. In addition to being complex, these first coupling means are also heavy and very expensive;
- the need to provide a measurement pick-up for measuring the various components of the loading pattern; and
- the need to provide a box for introducing forces allowing the forces produced in a fixed frame of reference to be transmitted to the rotating frame of reference (output shaft).

Another source, document WO-99/60362, discloses a test rig of the aforementioned type and which additionally comprises, to support the transmission gearbox that is to be tested, a clamping plate which bears this gearbox and can be driven in rotation, about the rotor shaft (output shaft) of said transmission gearbox by two actuators. These actuators are intended only to correct the angular position (about the direction defined by the rotor shaft) in the plane of the clamping plate of the transmission gearbox so as to compensate for the parasitic rotation thereof, under the effect of the torque applied to the input shaft (or shafts). These known means (clamping plate and actuators) therefore have the purpose of reducing angular misalignments in the input shaft (or shafts) and overloads and damage introduced as a result of these misalignments.

SUMMARY OF THE INVENTION

The present invention relates to a closed loop or open loop test rig that makes it possible to overcome the aforementioned drawbacks.

To this end, according to the invention, said test rig for testing a power transmission device, particularly a helicopter transmission gearbox, comprising at least an input shaft, an output shaft and a casing, said test rig comprising:

- a first assembly comprising coupling means and a coupling shaft which can be connected, via said coupling means to the output shaft of the power transmission device that is to be tested;
- a second assembly which can be connected to the input shaft of the power transmission device that is to be tested;
- a position-adjustable support on which the casing of the power transmission device that is to be tested can be mounted; and
- controllable adjusting means for adjusting the position of said support, is notable in that said coupling means are formed in such a way as to be able to produce a rigid and coaxial coupling between said coupling shaft and the output shaft of the power transmission device, and in that said support and said adjusting means are formed in such a way as to bring the casing of the power transmission device, when mounted on said support, into a spatial position such that all the forces and moments likely to be generated on the output shaft are applied to said casing.

Thus, by virtue of the invention, the output shaft of the power transmission device (which is secured to the coupling shaft of said first element of the test rig) becomes the reference, and the adjusting means which act on the position of the power transmission device (via said adjustable support) make it possible to introduce the forces and moments needed for simulation, through the casing of said power transmission device. Said adjusting means therefore not only spatially position said support (and therefore the casing of the power transmission device) to compensate for any defects in positioning, but also introduce a loading pattern which simulates the actual operating conditions. In consequence, the present invention makes it possible to reverse the integration architecture, by comparison with the abovementioned customary solution (casing secured to a fixed frame of reference taken as reference and coupling means intended for compensation).

Hence, said means of coupling (between the coupling shaft and the output shaft) can be produced in a very simple and inexpensive way because they do not have to take into consideration the defects in positioning and the parasitic forces (which are compensated for by the adjusting means), thus making it possible to overcome the aforementioned drawbacks.

It will also be noted that, when a helicopter transmission gearbox is being tested, the control of the mean and dynamic forces in a fixed frame of reference which is implemented by the present invention makes it possible, in particular:

to simulate more simply the operation of the mechanical parts of the helicopter by introducing a complete loading pattern of forces and moments representative of the rotor head loading pattern without having to resort to a mechanical box to transfer forces from the fixed frame of reference to the rotating frame of reference;

to reduce the "torque ripple". This phenomenon, which is manifested in a cyclic variation of the torque about its mean value, is due to the excitation of the entire dynamic loop by the defects of the moving inertial parts (clearances, imbalances, angular misalignments, defects of parallelism, pitch errors, etc). As the torque ripple observed on test rigs is generally higher than that accepted on the helicopter, it is advantageous to be able to bring it down to a comparable level. Introducing forces via the casing makes it possible to act with effect on the torque ripple; and to avoid measurements in a rotating frame of reference on the output shaft, thus making it possible to eliminate the measurement pick-up, which is expensive and delicate, and which is needed on customary test rigs.

As preference, said adjusting means adjust the position of said support in such a way as to apply forces and moments along the six degrees of freedom of the casing of the power transmission device to said casing.

Thus, unlike the test rig described in document WO-99/60362 which anticipates actuators intended solely to adjust the angular position about the rotor shaft of the transmission gearbox that is to be tested, the adjusting means of the test rig according to the invention make it possible simultaneously:

to introduce the forces and moments via the casing; and to position said casing spatially, namely along its six degrees of freedom.

Furthermore, in a preferred, but nonexclusive embodiment, said adjusting means comprise jacks.

The present invention also relates to a test system comprising:

a test rig for testing a power transmission device, particularly a helicopter transmission gearbox; and a power transmission device which comprises at least an input shaft, an output shaft and a casing, and which is mounted on said test rig.

According to the invention, said test system is notable in that said test rig is of the type described hereinabove.

In a preferred embodiment:

said support is provided with a housing which is able to receive an auxiliary support; and said test system additionally comprises a removable auxiliary support to which the casing of the power transmission device is fixed and which has a shape suited to said housing of the support of the test rig so that it can be mounted stably on said support.

This last embodiment makes it possible to reduce the operations to be performed and the parts to be changed when replacing a power transmission device that is to be tested with another one, since said support remains on the test rig and only said auxiliary support needs to be changed with the various parts it bears.

BRIEF DESCRIPTION OF THE DRAWINGS

The figures of the appended drawing will make it easy to understand how the invention may be embodied. In these figures, identical references denote similar elements.

DESCRIPTION OF THE PREFERRED EMBODIMENT

Figure 1:
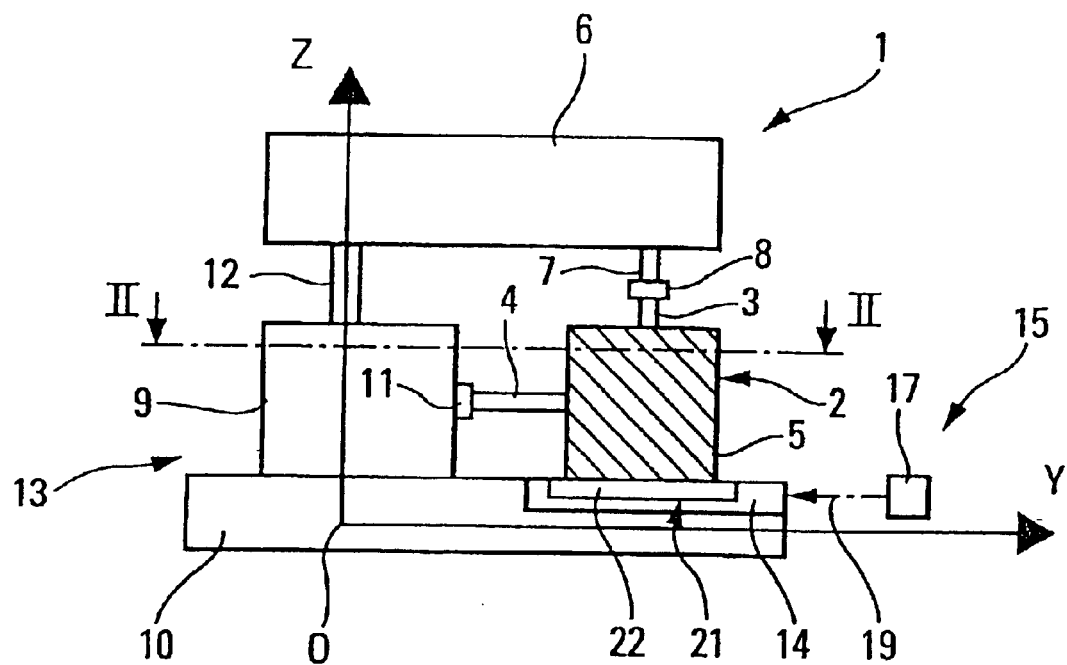
FIG. 1 is a schematic of a test system according to the invention.
Figure 2:
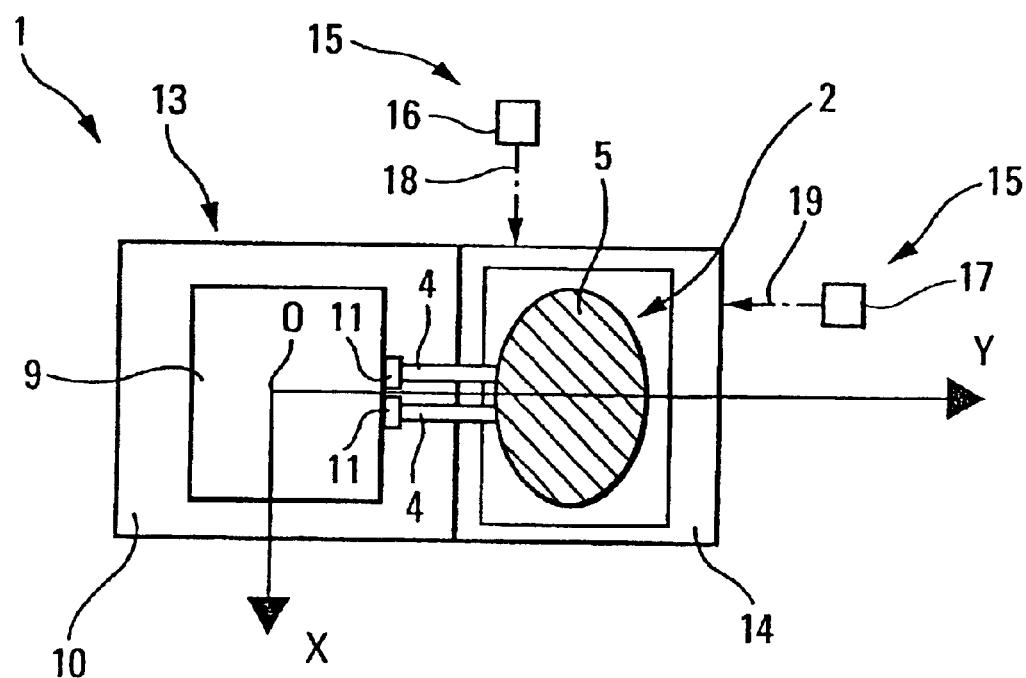
FIG. 2 is a schematic view on II—II of FIG. 1.

The test rig 1 according to the invention and depicted schematically in FIGS. 1 and 2 is used to test a power transmission device 2, particularly a helicopter transmission gearbox (main, intermediate or tail gearbox).

Figure 3:
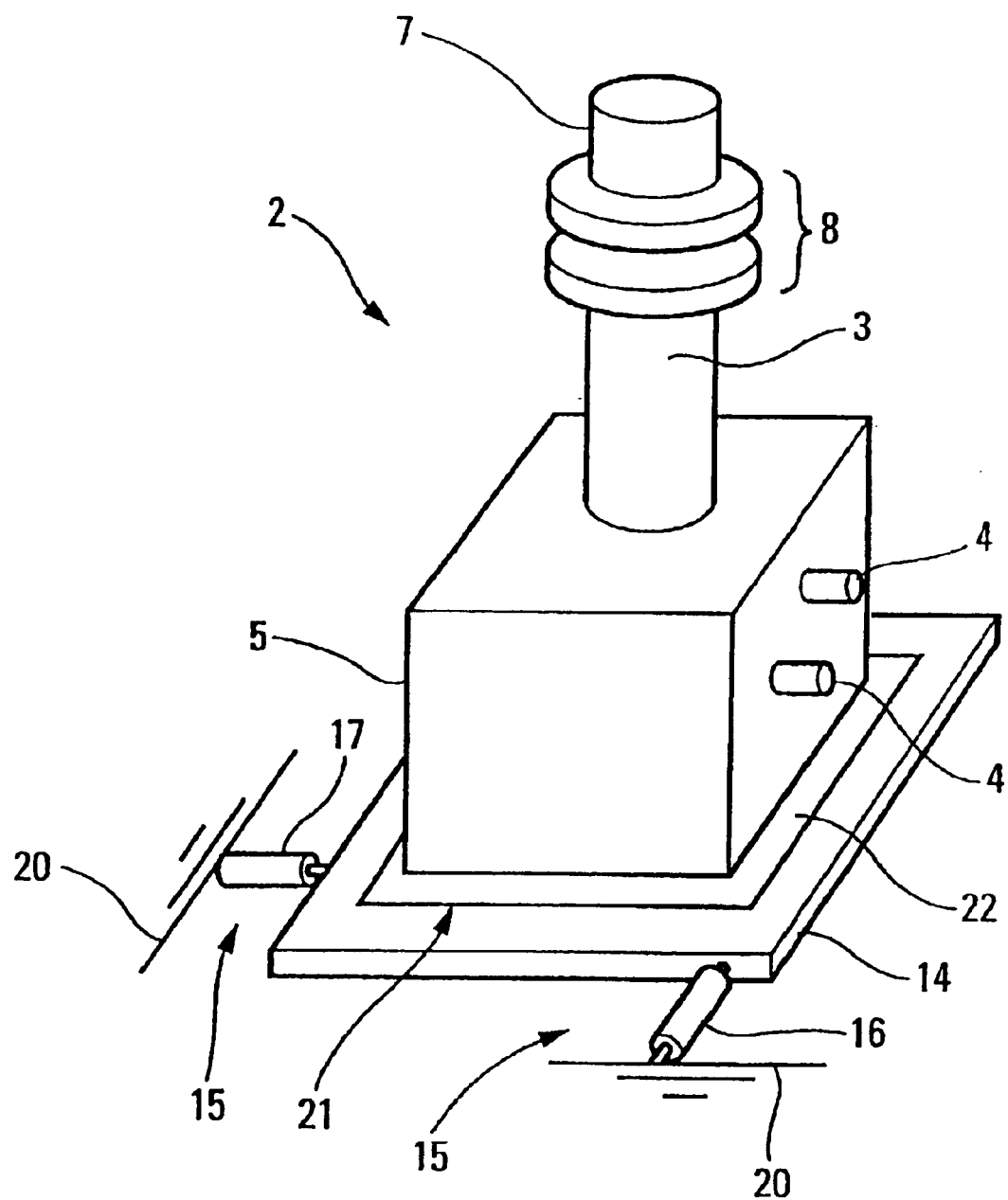
FIG. 3 schematically illustrates one particular embodiment of part of a test rig according to the invention.

In the context of the present invention, a power transmission gearbox 2 comprises, in particular, in the customary way:

at least an output shaft 3 (a rotor shaft for example) which is subjected to a loading pattern of six forces and moments;

at least an input shaft 4 (power drive shaft) and more particularly two input shafts 4 in the particular embodiments of FIGS. 1 to 3; and a casing 5 which is capable of reacting all the forces in various ways (interface plate, bracing struts, blocks, etc.).

It is known that, in order to test such a power transmission device 2, the test rig 1 generally carries out two types of test, namely:

development tests, the purpose of which is to simulate the actual operating conditions as faithfully as possible (particularly to simulate the rotor head loading pattern and the levels of load in the transmission shafts on a main transmission gearbox for a helicopter) of the power transmission device 2; and acceptance tests, the purpose of which is to check the correct operation of the various mechanical parts, under a standard loading spectrum (measuring torque, rotational speeds and temperatures in particular).

To this end, said test rig 1 which on its own forms an open kinematic loop (of the mechanical, hydraulic or electrical type) comprises, in a known way, as depicted schematically in FIG. 1:

a first assembly 6 which comprises a coupling shaft (or transmission shaft) 7 which can be connected, by coupling means 8, to the output shaft 3 of the power transmission device 2 which is to be tested; and a second assembly 9 which is mounted on a support element 10 arranged, for example, in a horizontal plane OXY, which can be connected, by conventional coupling means 11 of the "flector" type, for example, to the input shafts 4 of the power transmission device 2 that is to be tested, and which is geometrically and kinematically suited to said power transmission device 2.

If the test rig 1 is of the closed loop type, it additionally comprises, in the known way, at least one transmission shaft 12, for example of vertical axis OZ, which connects said first and second assemblies 6 and 9.

Said test rig 1 and the power transmission device 2 mounted thereon in this case form a test system 13 which constitutes a closed loop which means that, during a test, the power delivered by the output shaft 3 is reinjected into the input shafts 4 of the power transmission device 2 via the coupling shaft 7, the assembly 6, the transmission shaft 12 and the assembly 9. This closed loop (or this test system 13) therefore consumes very little power. Only energy losses are actually consumed.

The simulation carried out by the test rig 1 during a test consists in recreating the various stresses (driving of the input shafts, dissipation of power in the rotor, loading pattern of aerodynamic forces introduced by the rotor) using mechanical, hydraulic or electrical techniques, without necessarily supplying all of the power.

In particular, in the case of transmission gearboxes (main, intermediate and tail gearboxes) of a helicopter, the main things simulated are:

the driving torques and the rotor torques;

the speeds;

the aerodynamic forces on the rotor 3 (thrust, bending);

the reaction forces in the casing 5; and the forces involved in driving accessories (pumps, alternator, fan, etc.).

According to the invention:

said coupling means 8 are formed (in the usual way) in such a way as to be able to produce a rigid and coaxial coupling between said coupling shaft 7 and the output shaft 3 of the power transmission device 2, which rigid coupling is capable of transmitting all the forces and the rotation. As a preference, said coupling means 8 are of the conventional bolted-flange type; and said test rig 1 additionally comprises:

a position-adjustable support 14 on which the casing 5 of the power transmission device 2 that is to be tested can be mounted (preferably indirectly, as will be seen in greater detail below); and controllable adjusting means 15 for adjusting the position of said support 14 and balancing the forces, which are formed in such a way as to bring the casing 5 of the power transmission device 2, when mounted on said support 14, into a spatial position that is such that all the forces and moments likely to be generated on the output shaft 3 are applied to said casing 5.

Thus, by virtue of the invention, the output shaft 3 of the power transmission device 2 (which is secured to the coupling shaft 7 of said first element 6 of the test rig 1) becomes the reference, and the adjusting means 15 which act on the spatial position of the power transmission device 2 (via the support 14) make it possible to introduce, via the casing 5 of the device 2, the forces and moments needed for simulation. Thus, said adjusting means 15 make it possible to ensure the demanded mechanical equilibrium (forces and position) because not only do they spatially position said support 14 (and therefore the casing 5 of the power transmission device 2) in order to compensate for any defects in positioning, but they also apply a loading pattern which simulates the actual operating conditions. In consequence, the present invention makes it possible to reverse the integration architecture by comparison with the customary solution (casing secured to a fixed frame of reference and coupling means intended for compensating).

Hence, said means 8 of coupling (between the coupling shaft 7 and the output shaft 3) which produce only a rigid coupling, can be produced very simply and inexpensively because they do not have to take into consideration the defects in positioning and the parasitic forces (which are compensated for by the adjusting means 15).

It will also be noted that, when a helicopter transmission gearbox is being tested, the control of the mean and dynamic forces in a fixed frame of reference which is implemented by the present invention makes it possible, in particular:

to simulate more simply the operation of the mechanical parts of the helicopter by introducing a complete loading pattern of forces and moments representative of the rotor head loading pattern without having to resort to a mechanical box to transfer forces from the fixed frame of reference to the rotating frame of reference;

to reduce the "torque ripple". This phenomenon, which is manifested in a cyclic variation of the torque about its mean value, is due to the excitation of the entire dynamic loop by the defects of the moving inertial parts (clearances, imbalances, angular misalignments, defects of parallelism, pitch errors, etc). As the torque ripple observed on a conventional test rig is generally higher than that accepted on the helicopter, it is advantageous to be able to bring it down to a comparable level. Introducing forces via the casing 5 makes it possible to act with effect on the torque ripple; and to avoid measurements in a rotating frame of reference on the output shaft 3, thus making it possible to eliminate the measurement pick-up, which is expensive and delicate, and which is needed on customary test rigs.

Furthermore, in a preferred embodiment depicted in FIG. 3, said adjusting means 15 comprise a number of jacks 16, 17 (for example six jacks) with controlled authority and capable of imposing a particular position or a particular load on the power transmission device 2 (as illustrated also in chain line 18 and 19 in FIGS. 1 and 2) along the six degrees of freedom, and of doing so by reference to a fixed frame of reference 20. Said fixed frame of reference 20 preferably corresponds to the support element 10 which is fixed and very stable.

These jacks 16, 17 (hydraulic, electrical, etc.), only two of which have been depicted in the FIGS. 1 to 3 in order to simplify the drawing, are active in terms of mean value and in dynamic.

Of course, in the context of the present invention, other known means (not depicted) can be used for adjusting the spatial position of the support 14 in the way described previously.

Furthermore, in the preferred embodiment depicted in FIG. 3:

said support 14 is provided with a housing 21; and said test system 13 additionally comprises an auxiliary support 22 which is removable, to which the casing 5 of the power transmission device 2 is fixed and which has a shape suited to said housing 21 of the support 14 so that it can be mounted stably on said support 14, if necessary using customary fixing means, not depicted.

This preferred embodiment makes it possible to reduce the operations to be performed and the parts to be changed when replacing a power transmission device 2 that is to be tested with another device 2, since said support 14 remains on the test rig 1 and only said auxiliary support 22 needs to be changed with the power transmission device 2 it bears.

What is claimed is:

1. A test rig for testing a power transmission device, which comprises an input shaft, an output shaft and a casing, said test rig comprising:

a first assembly comprising coupling means and a coupling shaft that can be connected, via said coupling means, to the output shaft of the power transmission device;

a second assembly that can be connected to the input shaft of the power transmission device;

a position-adjustable support on which the casing of the power transmission device can be mounted; and controllable adjusting means for adjusting the position of said support, wherein:

said coupling means produce a rigid and coaxial coupling between said coupling shaft and the output shaft of the power transmission device, said adjusting means adjust the position of said support so as to apply forces and moments acting along six degrees of freedom of the casing to the casing, and said support and said adjusting means bring the casing of the power transmission device, when mounted on said support, into a spatial position such that all the forces and moments likely to be generated on the output shaft are applied to said casing.

2. The test rig as claimed in claim 1, wherein said adjusting means comprise jacks.

3. The test rig as claimed in claim 1, wherein said support is provided with a housing that receives an auxiliary support.

4. A test system comprising:

a test rig for testing a power transmission device; and a power transmission device, comprising an input shaft, an output shaft and a casing, that is mounted on said test rig, wherein:

said test rig is of the type specified in claim 1.

5. The test system as claimed in claim 4, further comprising:

a removable auxiliary support to which the casing of the power transmission device is fixed, wherein:

the removable auxiliary support has a shape suited to said housing of the support of the test rig so that it can be mounted stably on said support.

6. The test rig as claimed in claim 2, wherein said adjusting means comprise six jacks.

7. The test rig as claimed in claim 2, wherein said jacks adjust the position of said support to actively control the mean value and dynamic forces acting on said casing.

8. The test rig as claimed in claim 6, wherein said jacks adjust the position of said support to actively control the mean value and dynamic forces acting on said casing.

9. The test rig as claimed in claim 2, wherein said coupling means are of the bolted-flange type.

10. The test rig as claimed in claim 6, wherein said coupling means are of the bolted-flange type.

11. A test rig for testing a power transmission device, which comprises an input shaft, an output shaft and a casing, said test rig comprising:

a first assembly comprising coupling means and a coupling shaft that can be connected, via said coupling means, to the output shaft of the power transmission device;

a second assembly that can be connected to the input shaft of the power transmission device;

a position-adjustable support on which the casing of the power transmission device can be mounted; and controllable adjusting means for adjusting the position of said support, wherein:

said coupling means produce a rigid and coaxial coupling between said coupling shaft and the output shaft of the power transmission device, said adjusting means adjust the position of said support so as to apply forces and moments acting along six degrees of freedom of the casing to the casing, said support and said adjusting means bring the casing of the power transmission device, when mounted on said support, into a spatial position such that all the forces and moments likely to be generated on the output shaft are applied to said casing, and measurement pick-up in a rotating frame of reference on the output shaft is eliminated.

12. The test rig as claimed in claim 11, wherein said adjusting means comprise jacks.

13. The test rig as claimed in claim 11, wherein said support is provided with a housing that receives an auxiliary support.

14. A test system comprising:

a test rig for testing a power transmission device; and a power transmission device, comprising an input shaft, an output shaft and a casing, that is mounted on said test rig, wherein:

said test rig is of the type specified in claim 11.

15. The test system as claimed in claim 14, further comprising:

a removable auxiliary support to which the casing of the power transmission device is fixed, wherein:

the removable auxiliary support has a shape suited to said housing of the support of the test rig so that it can be mounted stably on said support.

16. The test rig as claimed in claim 12, wherein said adjusting means comprise six jacks.

17. The test rig as claimed in claim 12, wherein said jacks adjust the position of said support to actively control the mean value and dynamic forces acting on said casing.

18. The test rig as claimed in claim 16, wherein said jacks adjust the position of said support to actively control the mean value and dynamic forces acting on said casing.

19. The test rig as claimed in claim 12, wherein said coupling means are of the bolted-flange type.

20. The test rig as claimed in claim 16, wherein said coupling means are of the bolted-flange type.

* * * * *